(12) United States Patent
Mayer et al.

(10) Patent No.: US 11,472,125 B2
(45) Date of Patent: Oct. 18, 2022

(54) METHOD OF ANCHORING A FIRST OBJECT IN A SECOND OBJECT

(71) Applicants: Woodwelding AG, Stansstad (CH); Ikea Supply AG, Pratteln (CH)

(72) Inventors: Jörg Mayer, Niederlenz (CH); Mario Lehmann, Les Pommerats (CH); Håkan Käll, Älmhult (SE); Muthumariappan Sankaran, Älmhult (SE)

(73) Assignees: WOODWELDING AG, Stansstadt (CH); IKEA SUPPLY AG, Pratteln (CH)

( * ) Notice: Subject to any disclaimer, the term of this patent is extended or adjusted under 35 U.S.C. 154(b) by 0 days.

(21) Appl. No.: 17/004,314

(22) Filed: Aug. 27, 2020

(65) Prior Publication Data
US 2020/0391448 A1 Dec. 17, 2020

Related U.S. Application Data

(62) Division of application No. 15/313,245, filed as application No. PCT/EP2015/061855 on May 28, 2015, now Pat. No. 10,780,644.

(30) Foreign Application Priority Data

May 28, 2014 (CH) ..................... 00824/14

(51) Int. Cl.
 *B29C 65/08* (2006.01)
 *B29C 65/56* (2006.01)
 (Continued)

(52) U.S. Cl.
 CPC .............. *B29C 65/08* (2013.01); *B29C 65/48* (2013.01); *B29C 65/4815* (2013.01);
 (Continued)

(58) Field of Classification Search
 None
 See application file for complete search history.

(56) References Cited

U.S. PATENT DOCUMENTS 4,252,587 A * 2/1981 Harden ............... B29C 65/7844
156/73.5
4,613,320 A * 9/1986 Lerner ................... B29C 65/18
493/198

(Continued)

FOREIGN PATENT DOCUMENTS

JP 2004-316901 11/2004
JP 2012-513552 6/2012
(Continued)

OTHER PUBLICATIONS

International Preliminary Report on Patentability dated Nov. 29, 2016, Application No. PCT/EP2015/061855.
(Continued)

*Primary Examiner* — Christopher T Schatz
(74) *Attorney, Agent, or Firm* — Rankin, Hill & Clark LLP

(57) ABSTRACT

A method for joining two objects by anchoring an insert portion provided on a first object in an opening provided on a second object. The anchorage is achieved by liquefaction of a thermoplastic material and interpenetration of the liquefied material and a penetrable material, the two materials being arranged on opposite surfaces of the insert portion and the wall of the opening. During the step of inserting the insert portion in the opening and/or during anchorage a clamping force is applied to opposing surfaces of the second object to prevent the second object from cracking or bulging.

10 Claims, 4 Drawing Sheets

(51) Int. Cl.
    *B29C 65/60* (2006.01)
    *B29C 65/64* (2006.01)
    *B29C 65/00* (2006.01)
    *F16B 3/00* (2006.01)
    *B29C 65/50* (2006.01)
    *B29C 65/48* (2006.01)
    *B29C 65/78* (2006.01)
    *B29C 65/06* (2006.01)
    *B29K 309/08* (2006.01)
    *B29K 677/00* (2006.01)

(52) U.S. Cl.
    CPC ........ *B29C 65/5057* (2013.01); *B29C 65/564* (2013.01); *B29C 65/565* (2013.01); *B29C 65/604* (2013.01); *B29C 65/608* (2013.01); *B29C 65/645* (2013.01); *B29C 65/7841* (2013.01); *B29C 66/006* (2013.01); *B29C 66/02242* (2013.01); *B29C 66/1122* (2013.01); *B29C 66/1142* (2013.01); *B29C 66/126* (2013.01); *B29C 66/30221* (2013.01); *B29C 66/30223* (2013.01); *B29C 66/30321* (2013.01); *B29C 66/30326* (2013.01); *B29C 66/41* (2013.01); *B29C 66/43* (2013.01); *B29C 66/474* (2013.01); *B29C 66/727* (2013.01); *B29C 66/729* (2013.01); *B29C 66/7212* (2013.01); *B29C 66/7392* (2013.01); *B29C 66/7486* (2013.01); *B29C 66/7487* (2013.01); *B29C 66/81417* (2013.01); *B29C 66/81429* (2013.01); *B29C 66/8322* (2013.01); *B29C 66/9592* (2013.01); *F16B 3/005* (2013.01); *B29C 65/0618* (2013.01); *B29C 66/71* (2013.01); *B29K 2309/08* (2013.01); *B29K 2677/00* (2013.01); *B29K 2995/0046* (2013.01)

(56) References Cited

U.S. PATENT DOCUMENTS

| | | |
|---|---|---|
| 4,784,591 A | 11/1988 | Ackermann |
| 5,879,115 A | 3/1999 | Medal |
| 5,902,657 A | 5/1999 | Hanson et al. |
| 2009/0104399 A1 | 4/2009 | Field |

FOREIGN PATENT DOCUMENTS

| | | |
|---|---|---|
| JP | 2014-77345 | 5/2014 |
| WO | 98/42988 | 10/1998 |
| WO | 2006/002569 | 1/2006 |
| WO | 2008/080238 | 7/2008 |
| WO | 2008/080239 | 7/2008 |
| WO | 2016/054751 | 4/2016 |

OTHER PUBLICATIONS

Indian Office Action dated Jan. 31, 2020, Application No. 201637040583, 5 pages.

\* cited by examiner

METHOD OF ANCHORING A FIRST OBJECT IN A SECOND OBJECT

BACKGROUND OF THE INVENTION

Field of the Invention

The invention is in the field of mechanical engineering and construction and concerns a method for joining two objects. A first one of the object includes an insert portion and the other object includes an opening, and, for the two objects to be joined, the insert portion is anchored in the opening, wherein, in the anchoring area, one of the objects includes a solid material having thermoplastic properties, and the other object includes a solid material that is penetrable by the material having thermoplastic properties when liquefied. The penetrable material of the second object is, e.g., fibrous or porous. Especially, it may be a wood-based material such as wood, chipboard, etc. The second object may be a board, and the opening may be an opening in the narrow side face of the board.

Description of the Related Art

From e.g. the publications WO 96/01377 (Createc), WO 98/042988 (Woodwelding) and WO 2006/002569 (Woodwelding) or WO 2008/080239 a first approach is known to anchor inserts including materials having thermoplastic properties in fibrous or porous materials such as e.g. chipboard or wood. For such anchoring, the insert is positioned relative to the opening, and then mechanical vibration, in particular ultrasonic vibration, and a force directed for pressing the insert into the opening are simultaneously applied to the insert. In the step of positioning the insert, no relevant force is used, i.e., on application of the vibratory energy, the positioned insert will vibrate freely, or will, due to the named force pressing it against the fibrous or porous material, transmit the vibratory energy to the latter. In the step of applying vibration and force, the material having thermoplastic properties is liquefied due to friction heat at least where in contact with the fibrous or porous material and it penetrates into the fibrous or porous material of the walls of the opening and forms on re-solidification a positive fit connection with the porous or fibrous material.

According to a second, alternative approach, the second object (including a second material penetrable by a thermoplastic material) may be chosen to include an opening having a depth and the first object (including a first material being a solid material having thermoplastic properties) to include an insert portion having a length, wherein the opening and the insert portion are adapted to each other for the insert portion to be positioned in the opening with an interference fit. In this, the first and second materials constitute at least part of opposite surface areas of insert portion and opening pressed against each other in the interference fit. The interference fit may then be established by placing the insert portion in the opening and applying an interference force, and only thereafter, the insert portion is anchored in the opening by transferring energy suitable for liquefaction of the first material to the vicinity of said opposite surface areas in an amount and for a time sufficient, for liquefaction of the first material and interpenetration of the first and second materials in the vicinity of the opposite surface areas and stopping the transfer of energy for a time sufficient for the first material liquefied during the step of anchoring to re-solidify. The energy may be mechanical vibration energy, in particular ultrasonic vibration.

Especially if the second, alternative approach (with establishing an interference fit prior to the anchoring step) but also on certain embodiments of the first approach in which during the step of applying vibration and force, for example described in WO 2008/080239, a slightly oversized portion of the insert is pressed into the opening, the second object may be subject to a considerable mechanical load due to the interference force. Depending to the composition of the penetrable material or possibly other materials of the anvil object, there may be a risk of cracks or other damages (such as portions flaking off) being caused by the introduction of the insert portion into the opening prior to the step of anchoring. This risk of such damages is particularly high if the second object is board shaped at least in sections and if the opening is an opening in the narrow side face of the board, in particular if the dimensions of the opening are of a same order of magnitude as the thickness of the board (board section) so that there is not too much of the penetrable material between the opening and the broad surfaces. The same applies to objects that are not necessarily board shaped if a distance between the opening and a side surface is comparably small, for example not larger than one or two times an opening diameter.

SUMMARY OF THE INVENTION

An object of the present invention is to provide a method for joining two objects based on the above-mentioned first or second approach where the risk of damages to the second object caused by inserting the insert portion in the opening if the insert portion has a slightly oversized cross section is minimized.

According to an aspect of the invention, a method of anchoring a first object in a second object is provided, the method including the steps of:
  providing the first object including a first material and providing the second object including a second material, wherein the first material is solid and includes thermoplastic properties and wherein the second material is solid and is penetrable by the first material when in a liquefied state, the second object having an end face with an opening with an opening axis and the first object further including an insert portion,
  wherein the opening and the insert portion are adapted to each other for the insert portion to be positioned in the opening, and wherein said first and second materials constitute at least part of opposite surface areas of insert portion and opening pressed against each other,
  applying a clamping force to the second object while the insert portion is at least partially inserted in the opening, the clamping force acting between two opposing clamping elements arranged so that the opening is between the surfaces on which the clamping elements act when the clamping force is applied, the clamping force acting in a direction non-parallel to the opening axis,
  anchoring the insert portion of the first object in the opening by transferring energy suitable for liquefaction of the first material to the vicinity of said opposite surface areas in an amount and for a time sufficient, for at least partial liquefaction of the first material and interpenetration of the first and second materials in the vicinity of said opposite surface areas;
  stopping the transfer of energy for a time sufficient for the first material liquefied during the step of anchoring to re-solidify.

In this, the clamping force may be applied during the step of anchoring or before the step of anchoring (for example, during the step of establishing an interference fit, especially by inserting the insert portion in the opening) or both.

The application of the clamping force reduces the risk that cracks are formed in the second object, since the second object is supported by the clamping force during at least a portion of the time during which the interference fit exerts a mechanical load on the second object. Also, the clamping force reduces the risk of visible bulges of the second object.

Whereas in the prior art, clamping is used for holding an object, for example for transport thereof, the present invention thus suggests applying a clamping force specifically—and for example locally—for keeping an object intact. Due to this, especially the clamping force may be applied in temporal and spatial correlation with the anchoring and/or the insertion of the insert portion in the opening.

In embodiments, the opening and the insert portion are adapted to each other for the insert portion to be inserted with an interference fit.

The fact that the opening and the insert portion are dimensionally adapted to each other for an interference fit (press-fit) implies that the insert portion is oversized at least locally compared with the opening, resulting in at least local pressure between insert portion and opening wall when the insert has a desired position within the opening, i.e. resulting in elastic compression of the insert portion and/or the wall of the opening. Therein the named first and second materials are arranged opposing each other at least in parts of areas of such compression.

This feature that the insert portion and the opening are adapted to each other for the insert portion to be positioned in the opening with an interference fit may, but does not need to be, used for establishing an interference fit before the step of anchoring, in accordance with the above-mentioned second approach. Then, the method includes the further step of establishing the interference fit by placing the insert portion in the opening and applying an interference force, and the step of anchoring the insert portion is carried out after the step of establishing the interference fit.

In such an optional method step of establishing the interference fit first, the insert portion is positioned in the desired position within the opening where it is retained by the above named interference fit. For achieving the interference fit, i.e. for generating the compression between insert portion and opening wall an interference force is necessary either for forcing the insert portion into the undersized opening or for clamping wall sections of the opening against the insert portion. The magnitude of the interference force corresponds substantially with the strength and area of the interference fit and it is mainly dependent on and limited by the relative dimensions of insert portion and opening and on the compressibility of either one or both of the two materials.

In alternative embodiments, no interference fit is established prior to the anchoring step, but the fact that the insert portion and the opening are adapted to each other for the insert portion to be positioned in the opening with an interference fit merely implies that an interference could be established if the insert portion was pressed further into the opening. In these embodiments, the insert portion prior to the anchoring step is placed relative to the opening only to an extent that no substantial force is necessary. During the step of anchoring, the insert portion is further moved relative to the opening, for example by being pressed further into the opening, until the opposite surface areas of the insert portion and the opening are in contact with each other, while at the same time parts of the first material are liquefied. These alternative embodiments are based on the above-mentioned first approach.

In an even further group of embodiments, the insert portion is not oversized compared to the opening, i.e. insert portion and opening are not adapted to each other for an interference fit. In these embodiments, the anchoring is carried out by a distally facing end face of the insert portion being pressed against a bottom and/or shoulder and/or taper of the opening, i.e. the opposite surface areas are the bottom/shoulder/taper of the opening and the according section of the insert portion pressed thereagainst.

Also in embodiments of this even further group, the approach according to the invention may be advantageous because due to the pressing of the insert portion into the opening and simultaneous liquefaction, a hydrostatic pressure may be built up in the opening, and the clamping force may counteract adverse effects of this hydrostatic pressure on the first object.

In embodiments, the second object has a board shaped section defining two broad surfaces and a narrow side face between the broad surfaces, wherein the above-mentioned end face with the opening(s) is the narrow side face of the board shaped section. Especially, the second object may be a board of a wood-based material, such as chipboard, fiber board, such as High Density Fiber board (HDF) and Medium Density Fiber board (MDF), or wood. In this text "chipboard" is used to refer to any composite materials manufactured by mixing wood particles of any shape with adhesives, independent of the product's shape, including, for example, oriented strand board.

In embodiments, the clamping force is perpendicular to the opening axis, i.e., the opening extends along a plane perpendicular to the clamping force. This plane in which the opening axis extends may especially be parallel to the broad surfaces of the board, i.e. to the board plane.

The clamping force may be a force that is constant or follows a controlled (pre-determined or dependent on measured parameters) time dependent profile, for example by being applied by a pressurized air based mechanism driven by a suitable compressor and possibly a regulator (including valves etc.). These embodiments feature the advantage of making a precise control and an easy adaptation to changing requirements—for example due to changing material compositions or element dimensions—possible.

In embodiments, applying the clamping force is coordinated with transferring energy and/or with inserting. In many embodiments, the clamping force is maintained until the energy input is sufficient for liquefying at least a part of the insert portion so that the pressure generated by the interference fit (if any) is substantially released.

Alternatively, the clamping force may be applied by holding the clamping elements at a fixed position relative to one another during the clamping step, for example by a mechanical locking mechanism. An embodiment of a suitable mechanical locking mechanism includes a knee lever or similar.

Embodiments that feature holding the clamping elements at a fixed position relative to one another have the advantage that they may be particularly simple to set up, with no additional energy input for the clamping force required, and that the clamping force is automatically adapted to the circumstances. In configurations with larger expanding forces on the second object (for example, of the insert portion is particularly strongly oversized compared to the opening), the tendency to bulge will be larger, but as the clamping elements are at a fixed distance, the clamping force will if necessary automatically be higher.

The clamping elements may be opposing jaws of a clamp. Alternatively, one of the clamping elements may be a support (such as a panel/table of a manufacturing machine) and the other one may equipped for being pressed/held relative to the support.

In a group of embodiments, a clamping surface area (i.e. the area of an interface between the respective clamping element and the surface portion against which it is pressed during clamping) of at least one of the clamping elements may be comparably small, for example smaller than the surface against which it is pressed (the broad surface in case of a board shaped second object) by at least a factor 5 or 10.

It has been found that the clamping surface only needs to approximately cover the insert portion, i.e. in a projection along the direction of the clamping force the dimension of the clamping surface does not need to be much larger than the according dimension of the insert portion. In embodiments, the clamping surface is slightly larger than the according dimensions of the insert portion, for example a lateral extension (extension perpendicular to the opening axis) maybe 1.5 to 8 or 2 to 5 times a diameter of the insert portion, whereas a longitudinal extension (extension parallel to the opening axis) may correspond to about 1.2 to 3 or 1.5 to 2.5 times the length of the insert portion. The condition may apply that for at least one of the clamping elements a clamping surface area corresponds to at most 40 times, preferably at most 20 times, and for example at most 15 times, and at least 1.5 times or at least 2.5 times an area of the insert portion as seen in a projection on a plane being perpendicular to the direction of the clamping force.

It has been found by the inventors that not necessarily the pressing force needs to be the decisive quantity for the prevention of damages but the mechanical pressure. By keeping the area of the clamping surface area comparably small, the pressing force required to upheld a certain mechanical pressure is kept comparably small. In embodiments with a chipboard board (panel) as the second object and with an insert portion of a diameter of about 10 mm, it has been found that the pressure should preferably be at least about 0.3 or 0.4 N/mm².

Further, the comparably small clamping surface areas make possible that the movable mass of clamping elements is comparably small, which may be a further advantage in a high speed process. The handling may be accelerated while the board remains protected from overly high impact due to too high clamping element momenta.

Especially, the second object may be provided with a plurality of openings at an according plurality of sites (for example spaced from each other on the narrow side face if the second object has a board shaped section) for anchoring a plurality of first objects therein, wherein the clamping force is applied individually for each site instead of by a large clamp extending over more than one of the sites. Especially, a device for applying the clamping force may include for at least one of the broad surfaces a plurality of clamping elements arranged side by side. A machine for carrying out the method may include the possibility of adjusting the distance between the clamping elements.

In the approach according to the invention, the first material is solid (at ambient temperature) and includes thermoplastic properties (i.e., it is liquefiable with the aid of thermal energy; in the following this material is called "thermoplastic material"), The second material is also solid and it is penetrable by the first material when the latter is in a liquefied state (i.e. the second material is fibrous or porous, it includes penetrable surface structures or it cannot resist such penetration under pressure). The penetrable material especially is rigid, substantially not elastically flexible (no elastomer characteristics) and not substantially plastically deformable. It further includes (actual or potential) spaces into which the liquefied material can flow or be pressed for the anchoring. It is, e.g., fibrous or porous or includes penetrable surface structures which are e.g. manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material that can be forced out of the pores, a composite of a soft material and a hard material or a heterogeneous material (such as wood) in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

Especially, the second material is not only solid at ambient temperature, but is such that it does not melt under the conditions that apply when the first material penetrates the surface structures. For example, the second material may be of a material that does not have thermoplastic properties, i.e. a material different from a thermoplastic material. The second material may further be such that it does not undergo a reversible liquefaction process or that it has a melting temperature substantially above a temperature at which the first material becomes flowable. For example, if the second material is meltable, for example if it is a metallic foam, its melting temperature or glass transition temperature may be higher than a glass transition temperature or melting temperature of the first material by at least 50° C. or at least 80° C. or at least 100° C.

In the anchoring step, energy is applied to one or the other of the objects, wherein the energy is to act as heat, in particular in areas (anchoring areas) in which, in embodiments due to the interference fit, surface areas of insert portion and opening wall are pressed against each other and include one each of the thermoplastic and the penetrable material. The heat causes the thermoplastic material to liquefy and the pressure of the interference fit and/or the pressure due to the pressing force causes interpenetration of the two materials, wherein, if applicable, the interference fit is at least partly relaxed.

In the last of the above-mentioned method steps, the supply of energy is stopped until the thermoplastic material liquefied and dislocated in the anchoring step is re-solidified, whereby in the interpenetration area a sort of composite material is formed, which connects the two objects in a positive fit connection.

The energy necessary for liquefying the thermoplastic material in the anchoring step may be supplied, as above discussed, to either one of the two objects. In embodiments, this is done in the form of mechanical vibration, in particular ultrasonic vibration, to be transformed into friction heat at the interface between the insert portion and the wall of the opening. The vibration, for example, has a main vibration direction parallel to the named opposite surfaces of insert portion and opening wall. Preferred therefore are, for achieving lateral anchorage, longitudinal vibrations substantially parallel to the depth of the opening or rotary vibrations with an axis substantially parallel to the depth of the opening.

In embodiments that include establishing an interference fit prior to anchoring, for overcoming the interference fit, it is necessary to apply a shearing load between the insert portion and the opening wall, wherein this shearing load may be caused by strong enough vibration of the one of insert portion or opening wall relative to the other one, or by the vibration and an additional shearing force acting between the two objects. For preventing undesired movement, in particular translational movement of the two objects relative to each other due to the shearing force, it may be necessary to counteract the latter in a suitable manner.

Other sorts of energy such as, e.g., irradiation with electromagnetic energy for which suitable absorbing means are to be provided at the locations where the interference fit is active, or corresponding heating (e.g., inductive or resistive heating) are applicable also.

The thermoplastic material and the penetrable material taking part in the anchorage may be present only on selected surfaces of the insert portion and on walls of the opening. For example, the insert portion may include a core of a not thermoplastic material and a coating thereof made of the thermoplastic material. However, they may also constitute larger portions of the two objects, which may include further portions of different materials or may fully consist of either the thermoplastic material or the penetrable material.

In the regions of the opposite surface areas either one of the two surfaces being pressed together may include structures functioning as energy directors, i.e. point-shaped or line-shaped elements protruding from a principal surface.

In addition or as an alternative to the approach according to this invention that includes applying a clamping force, the method of anchoring the first object may include using the thermoplastic material of the first object that has flown during the anchoring step for healing possible cracks in the second object. This may especially be combined with an insert portion design that favors in-plane (along the board plane) material flow. Examples of such designs are for example described in the Swiss patent application 01 539/14 in FIGS. 28 and 29 and their description.

Examples of second materials (penetrable materials) are wood-based materials such as chipboard ("chipboard" in this text includes any composite materials manufactured by mixing wood particles of any shape with adhesives, independent of the product's shape, including for example oriented strand board) or wood, or metallic or ceramic foams or possibly open porous structures of a material based on a not thermoplastic (thermosetting) polymer. Specific examples of penetrable materials applicable in the method according to the invention are solid materials such as wood, plywood, chipboard, cardboard, concrete brick material, porous glass, foams of metal, ceramic, or polymer materials, or sintered ceramic, glass or metal materials, wherein such materials include spaces into which the thermoplastic material can penetrate, which spaces are originally filled with air or with another displaceable or compressible material. Further examples are composite materials, which have the above stated properties, or materials with surfaces including a suitable roughness, suitable machined surface structures or suitable surface coatings (e.g. consisting of particles). If the penetrable material has thermoplastic properties it is necessary that it maintains its mechanical strength during the anchoring step either by further including a mechanically stable phase or by having a considerably higher melting temperature than the thermoplastic material to be liquefied in the anchoring step.

A thermoplastic material suitable for the method according to the invention is, under the conditions of the step of establishing the interference fit, also solid in the sense as above described for the penetrable material. It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibers or particles of material that has no thermoplastic properties or has thermoplastic properties including a melting temperature range that is considerably higher than the melting temperature range of the basic polymer.

Examples for the thermoplastic material applicable in the method according to the invention are thermoplastic polymers, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystall polymers (LCP) etc. LCPs are of particular interest since their sharp drop in viscosity during melting enables them to penetrate in very fine spaces in the penetrable material.

Usually either one of the two objects to be joined needs to be able to transfer the vibration energy, preferably with a minimum of energy loss, from a proximal object side, where a vibrating tool is applied, to a distal side, where the insert portion or the opening is arranged. If this object is fully made of the thermoplastic material the latter will need an elasticity coefficient (at ambient temperature) of at least 0.5.GPa or preferably of at least 1.0 GPa.

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g., sonotrode) is, for example, designed such that its contact face oscillates predominantly in the direction of the tool axis (longitudinal vibration) and with an amplitude of between 1 and 100 μm, preferably around 30 to 60 μm. Such preferred vibrations are, e.g., produced by ultrasonic devices as known from ultrasonic welding.

The invention also concerns a machine for carrying out the method. Such a machine includes an insertion mechanism capable of inserting the insert portion at least partially in the opening, an anchoring tool capable of transferring the energy suitable for liquefaction of the first material to the first object or the second object, or both, for the anchoring step, and further includes a clamping mechanism capable of applying the clamping force to the second object during insertion or anchoring or both.

The machine may include an insertion station and an anchoring station separate therefrom, wherein the clamping mechanism is capable of applying the clamping force at least in the anchoring station.

Alternatively, it may be equipped for carrying out the steps of inserting and of anchoring at a same station. In such embodiments, the machine may include a gripping arrangement adapted for holding the first object in place for insertion, for example without substantial force, wherein the anchoring tool is adapted for contacting the first object adjacent to the gripping arrangement and for inserting the insertion portion into the opening.

For carrying out the process simultaneously for different first objects (for example, fittings) at different anchoring sites of a same (or possibly different) second object, the machine may include a plurality of clamping elements defining an according number of clamping sites that correspond to the anchoring sites. For carrying out the method for different second objects, a distance between the clamping sites may be adjustable.

At least one of the clamping elements of the machine may include a non-sticking arrangement adapted for facilitating release of the clamping element from the second object after release of the clamping force. In embodiments, said non-sticking arrangement includes a non-sticking pad, for example made from low friction material, and/or a gas supply for supplying release gas to a position between the clamping element and the second object.

In a group of embodiments, the machine further includes a pressurized fluid cylinder, such as a pressurized gas (for example, pressurized air) cylinder or a hydraulic cylinder, for applying the clamping force on the clamping element.

A pressurized gas cylinder may also be present for attenuating/leveling the clamping force, especially in case of mechanical locking arrangements if otherwise damages to the surface of the second object are to be expected caused by too high pressures.

Applications of the concepts described in this text and illustrated in the figures include the furniture industry, especially furniture designed for self-assembly by the customer. In this, the first object may be a fitting, and the second object may be a furniture part with a board-shaped section.

Further applications include other branches of mechanical engineering and constructions, including the automotive, aviation and shipbuilding industries where the method may be suitable of anchoring an anchor in a lightweight board of any composition, building industry, etc.

BRIEF DESCRIPTION OF THE DRAWINGS

The invention and embodiments thereof are described in further detail in connection with the appended drawings that are all schematical. Same reference numbers refer to same or analogous elements. In the drawings.

DESCRIPTION OF THE PREFERRED EMBODIMENTS

Figure 1:
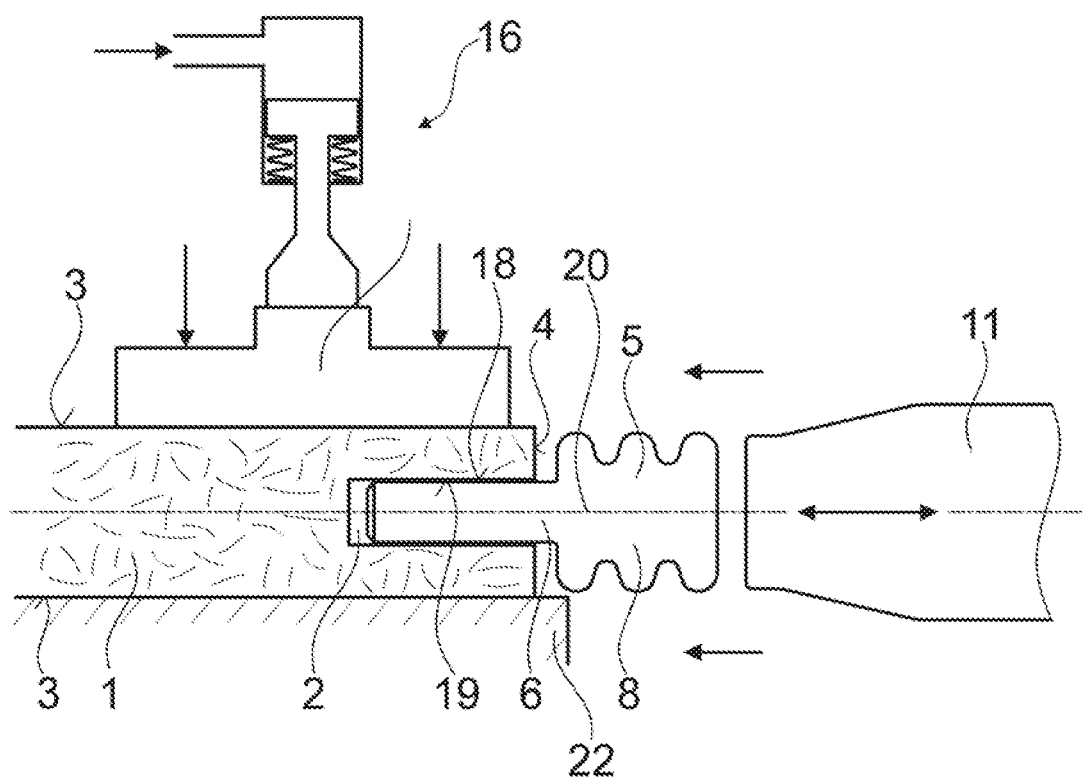
FIG. 1 illustrates an embodiment of the method according to the invention.

FIG. 1 depicts a board 1 of for example chipboard being the second object in a method according to the invention. The board has two opposed broad surfaces 3 and a narrow side face 4 with a blind opening 2. A fitting element 5 having a head portion 8 and an insert portion 6 serves as the first object in the method. The fitting element 5 in the depicted embodiment includes a thermoplastic material, for example a polyamide and is, according to an embodiment, made entirely or almost entirely from this thermoplastic material, whereas in alternative embodiments it may include a core of a not thermoplastic material with a coating of a thermoplastic material.

The insert portion 6 has a slightly oversized cross section compared to the opening 2 so that the insert portion is held in an interference fit in the opening 2 after the insert portion 6 has been introduced, for example by a pressing force acting in a direction of an axis 20 of the opening. Due to the interference fit, opposite surface areas 18, 19 of the insert portion 6 and the opening 2 are pressed against each other. In the subsequent anchoring step, a vibrating tool, namely a sonotrode 11 is used to couple mechanical vibration energy into the fitting element 5 to liquefy portions of the thermoplastic material of the fitting element 5, and preferably of the insert portion 6, that then penetrate into structures of the board 1 and yield, after the energy input stops, the above-described anchoring.

During the step of inserting and/or during the step of anchoring a clamping force is applied to the site where the anchoring takes place. In the depicted configuration, the clamping force is applied between a movable clamping element 21 and a support 22 serving as a second clamping element.

In embodiments that include establishing an interference fit, and in which the clamping force is applied during both steps, the clamping force serves for strengthening the second object 1 including the opening 2 (or a plurality of openings) and the penetrable material for better withstanding the establishment of the interference fit and the anchoring step. Also in embodiments that do not include the step of establishing the interference fit prior to the step of anchoring but in which the oversized section of the insert portion is only introduced during the application of the mechanical vibration, a similar strengthening results.

The clamping force to be applied may, for example, be achieved by connecting the movable clamping element 21 to, for example, a pressurized gas or air cylinder 16, as schematically sketched, a hydraulic cylinder, or a mechanic screw. In particular air cylinders and hydraulic cylinders are convenient in that the clamping pressure may be controlled by controlling the air- or hydraulic pressure.

Figure 2:
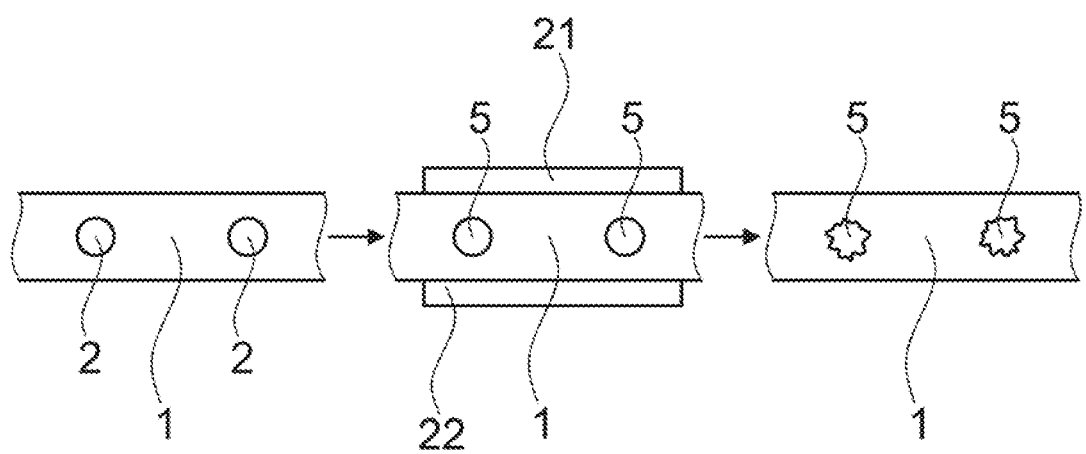
FIG. 2 shows an example with the clamping force being applied simultaneously to two anchoring sites.

FIG. 2 illustrates such an example of strengthening the first object 1 including the opening 2 (or a plurality of openings) and the penetrable material for better withstanding the establishment of the interference fit and the anchoring step. The object 1 again is, e.g., a chipboard and the openings extend from a narrow side thereof. FIG. 2 shows the board 1 viewed in the direction of its narrow side 4, and illustrates: on the left hand side: before the step of establishing the interference fit, in the middle: between the step of establishing the interference fit and the anchoring step, and on the right hand side: after the anchoring step. Prior to the step of establishing the interference fit, the board is strengthened by being clamped together with a pair of clamping jaws 21, 22. The clamping prevents bulging outwards of the board broad surfaces 3 on establishing the interference fit and such weakening the latter. This means that the clamping allows establishing a stronger interference fit than would be possible without it and therefore a stronger anchorage. As the stress of the interference fit is substantially relaxed during the anchoring step, since in the anchoring step the thermoplastic material of the fitting element 5 is at least partly liquefied, the clamping can be released after the anchoring step.

Figure 3A:
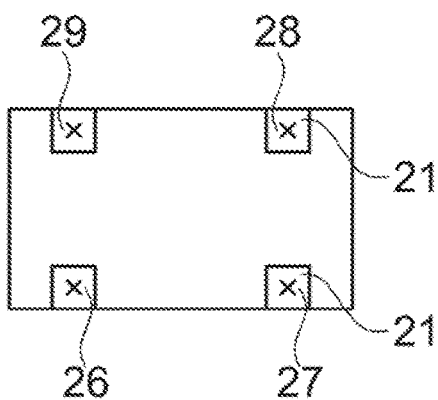
FIGS. 3a and 3b show a further example with the clamping force being applied simultaneously to two anchoring sites.

The depicted configuration of FIG. 2 is an example of the clamping elements covering a plurality of anchoring sites, i.e. a plurality of openings is between two clamping elements 21, 22. However, it is also possible, and often advantageous, to apply the clamping force simultaneously or one after the other to a plurality of clamping sites with separate clamping elements. FIG. 3a shows an example of a board 1, viewed in the direction of its broad side 3, that includes four anchoring sites 26, 27, 28, 29. For the step of establishing the interference fit (if any) and/or for the step of anchoring, a plurality of first, movable clamping elements 21 is used. In the depicted configuration, the anchoring sites 26, 27, 28, 29 are arranged at two opposed narrow side faces. Therein, at least the clamping and interference fit establishing/anchoring steps for the (two) anchoring sites 26, 27; 28, 29 of the same narrow side face 4 may be done simultaneously, with the possibility of carrying out the according step simultaneously for all four sites 26, 27, 28, 29.

Figure 3B:
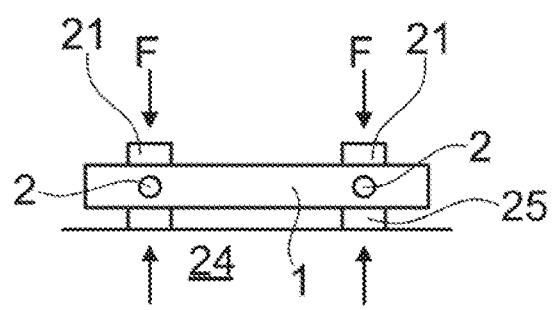

As shown in FIG. 3b, in which the board 1 is viewed from one of its narrow side faces 4, the respective opposed clamping elements may be second clamping elements 25 on a support 24. It is also possible to directly place the board 1 on such a support 24 (which then serves as clamping element), or to use second clamping elements that are also movable and for example belong to a clamping jaw.

Figure 4:
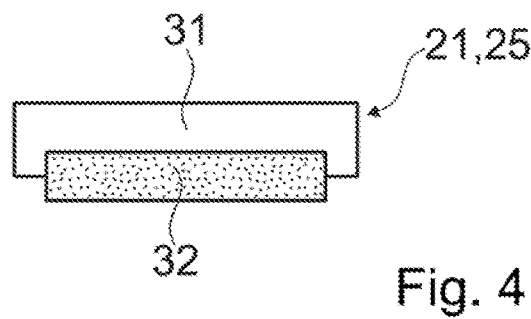
FIG. 4 illustrates a clamping element with a non-sticking pad

As the clamping elements are to exert a considerable pressure on the board 1 (in an example with chipboard as the penetrable material and with fittings 5 having an insert portion 6 of a diameter of about 7 mm, the necessary clamping pressure has been found to exceed 0.4 N/mm$^2$), depending on the surface properties of the board 1 there may be a certain risk of the clamping elements 21, 25 sticking to the broad surfaces when the clamping pressure is to be released. To this end, the clamping elements 21, 25 may be provided with a non-sticking pad 32 or surface coating, as schematically illustrated in FIG. 4. Such a non-sticking pad 32 or surface coating may, for example, include PTFE, for example sold under the trademark Teflon. The non-sticking pad 32 or surface coating may be held by a clamping element body 31 of conventional machinery material, such as stainless steel.

Figure 5:
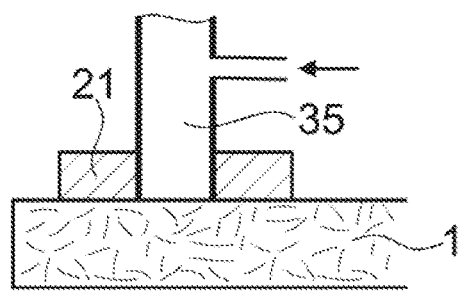
FIG. 5 illustrates using pressurized air for preventing any sticking.

A further possibility of dealing with the risk of sticking is shown in FIG. 5, where a clamping element 21 is provided with an air channel 35 opening towards the broad surface 3 of the board 1 and through which pressurized air is blown after the clamping process to release the clamp 21 from the broad surface 3 of the board 1.

Figure 6:
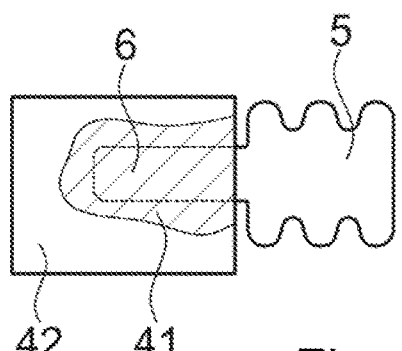
FIGS. 6 and 7 illustrate clamping surface areas.

FIG. 6 illustrates the principle of a clamping surface area optimized for the process. The interpenetration zone 41, in which a sort of composite material is formed as the thermoplastic material is liquefied, has, in a projection perpendicular to the broad side plane, an area slightly exceeding the dimension of the insert portion 6. Depending on the requirements, it may be advantageous that the clamping surface 42 covers the interpenetration zone 41 and extends somewhat beyond it. In situations, it may be advantageous if the clamping surface 42 (in contrast to what is shown in the schematic illustration of FIG. 1) extends to the edge between the broad surface 3 and the narrow side face 4 because in some materials this edge is particularly prone to damages. The area of the clamping surface 42 is preferably smaller than the total area of the broad surface 3, which faces the clamping element 21 and against which the clamping element 21 is pressed, by at least a factor 5.

Figure 7:
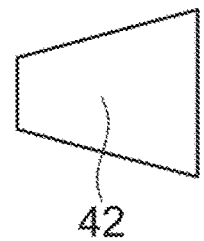

Whereas in FIG. 6 the clamping surface 42 is illustrated to be rectangular, other shapes of clamping surfaces 42 are possible, including trapezoid as shown in FIG. 7. In FIG. 7, the edge of the board is assumed to be on the right hand side (same orientation as FIG. 6).

Figure 8:
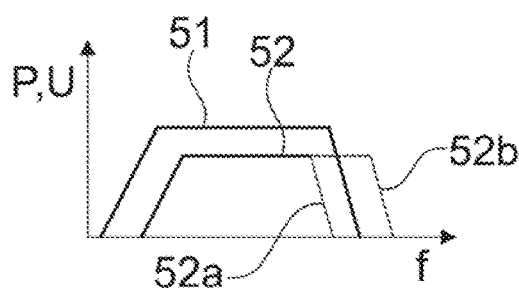
FIGS. 8 and 9 show examples for the application of pressure, vibration and clamping force as a function of the time.
Figure 9:
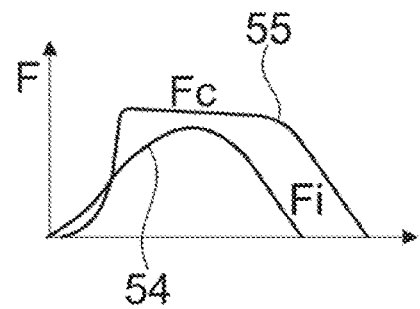

FIGS. 8 and 9 illustrate the possibility of coordinating the clamping pressure with the insertion and/or the mechanical energy input (in FIG. 8, U denotes the input power of ultrasonic vibration, P the pressure; in FIG. 9 $F_i$ is an interference force and $F_c$ a clamping force, the x-axis corresponds to the time in both figures).

As sketched in FIG. 8, the clamping pressure 51 may set in prior to the mechanical energy input 52. This may, for example, be advantageous in case, as further described hereinafter, the insertion and, if applicable, establishing an interference fit is carried out at a same station. In this case, the clamping force may set in at, or just before, the time the insert portion starts being pressed into the opening. If no interference fit is established prior to anchoring, the clamping force may be lower initially or set in only when the anchoring step starts. The energy input may stop prior to the clamping force being released (52a), at the same time or thereafter (52b). In the latter case, with energy input stopping after the clamping force being released (52b), it is beneficial that clamping force is not released before liquefaction and infiltration has caused a substantial reduction in the interference force.

FIG. 9 shows that the interference force 54 may relax as a consequence of the liquefaction process, and the clamping force 55 may stop after such relaxation. The onset of the respective forces is illustrated to be synchronized. Synchronization may be optimized to minimize the lag time.

As shown, the interference force can initially be higher than the clamping force as long as the crossover of both curves is below the damage threshold of the board material.

Furthermore, since the board material has an certain initial resistance against splitting—the clamping force does not need to be higher than the interference force, actually, only the sum of clamping force, damage threshold and some safety margin has to be higher than the interference force.

Instead of applying a constant pressure or a pressing force/pressure profile, the clamping force may be applied by holding the clamping elements at a fixed position relative to one another during the clamping step. Then, the clamping force may be zero or very small until the insertion of the insert portion starts exerting an expanding force on the board.

Figure 10:
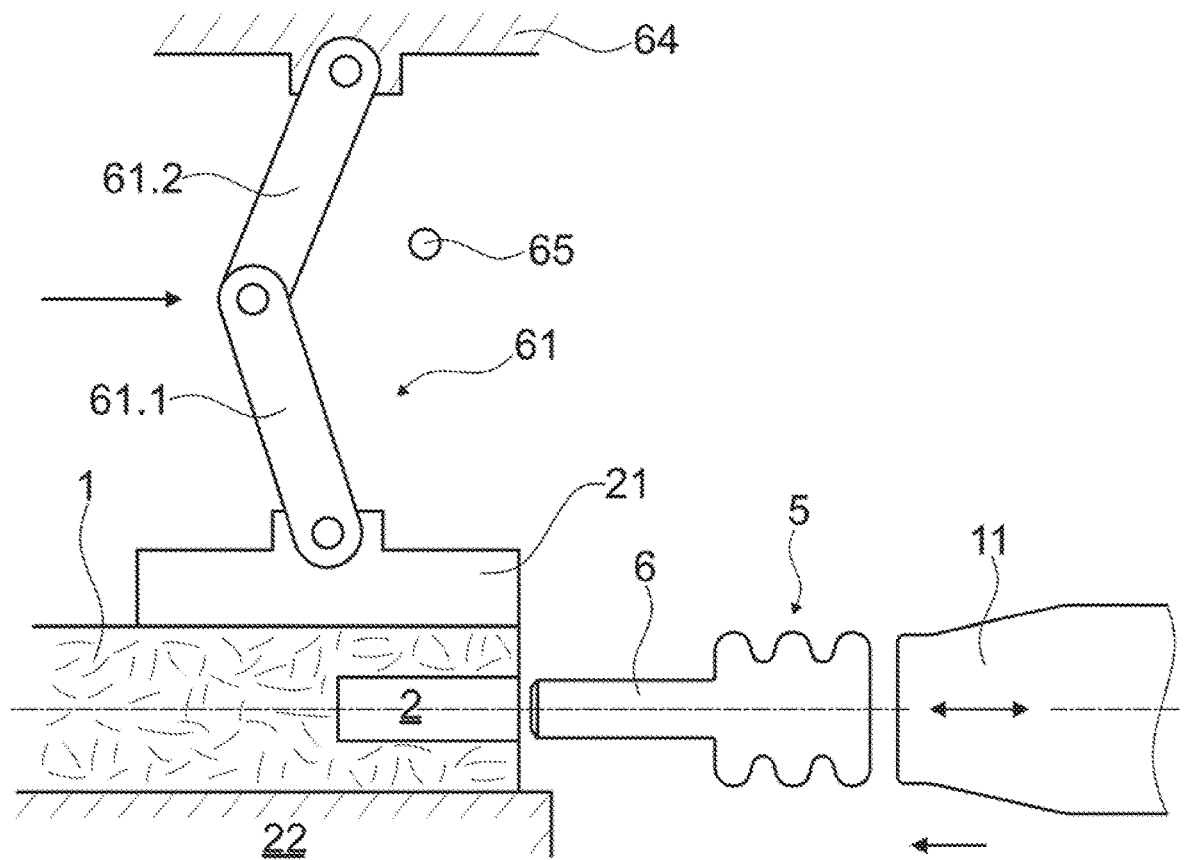
FIG. 10 illustrates a principle of applying the clamping force by a knee lever mechanism.

FIG. 10 very schematically shows an according mechanism employing the above mentioned fixed position. The clamping element 21 is held by a knee lever including a first lever arm 61.1 and a second lever arm 61.2, the second lever arm connected to a counter element 64 that, for example, together with a support 22 may form a load frame and may be held at a fixed distance to the support 22. At the onset of the process, the knee joint is brought into its correct position, for example by being moved (by any suitable means) into the direction of the arrow. A stop 65 is illustrated at a position in which the knee lever is moved slightly over the neutral point, so that the knee lever becomes self-locking and no external force needs to be applied for clamping.

Other locking mechanisms locking a distance between two clamping elements are possible.

Figure 11:
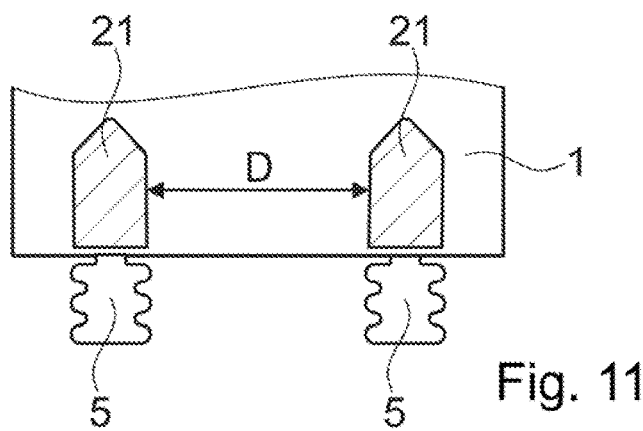
FIG. 11 illustrates the principle of applying the clamping force simultaneously to two anchoring sites by a machine with clamping elements having a variable distance.

FIG. 11 illustrates schematically the possibility of providing a manufacturing machine with clamping elements 21 having a variable, adjustable distance D. Thereby, the machine becomes very flexible for inserting parallel fitting elements 5 at different mutual distances D, and still see to it that clamping is achieved, by means of the clamping elements 21, at the relevant locations, i.e. in the current position of the fitting elements 5.

Figure 12:
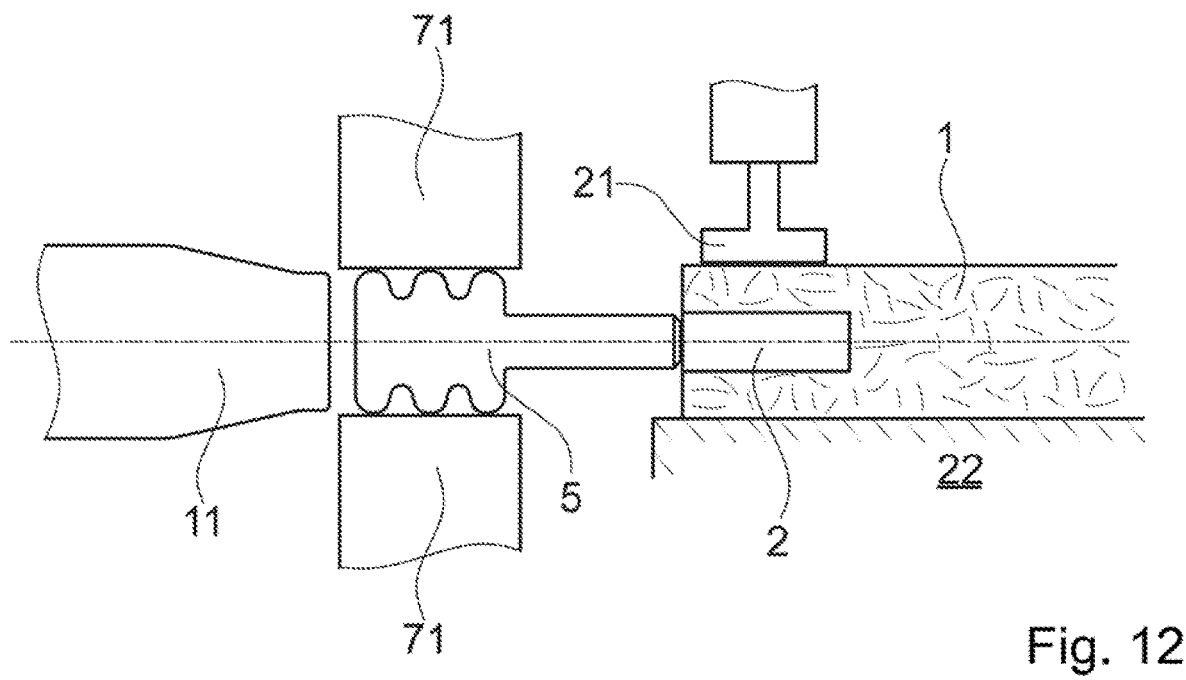
FIG. 12 shows the principle of inserting and subsequently anchoring the first object at a same station.

As previously mentioned, a machine for carrying out the method may include means for inserting the insert portion in the opening and means for carrying out the anchoring step at a same station or at different stations. FIG. 12 shows a station for performing both, the inserting step and the anchoring step.

A gripper 71 is used for holding the first object (fitting element 5) in place for insertion, substantially without exerting pressure. The sonotrode 11 exerts the pushing force for the insertion step until the insert portion 6 is inserted in the opening 2 to a sufficient depth for the fitting element 5 being held therein. If applicable, the pressing force is exerted until the interference fit is established.

The gripper 71 is then removed, and, for the anchoring step, the sonotrode 11 starts coupling mechanical energy into the fitting element 5 while still or again exerting a pressing force. The clamping force is exerted by means of the clamping element 21 and the support 22 during the anchoring step and/or during the insertion step, preferably during both the insertion step and the anchoring step.

Figure 13:
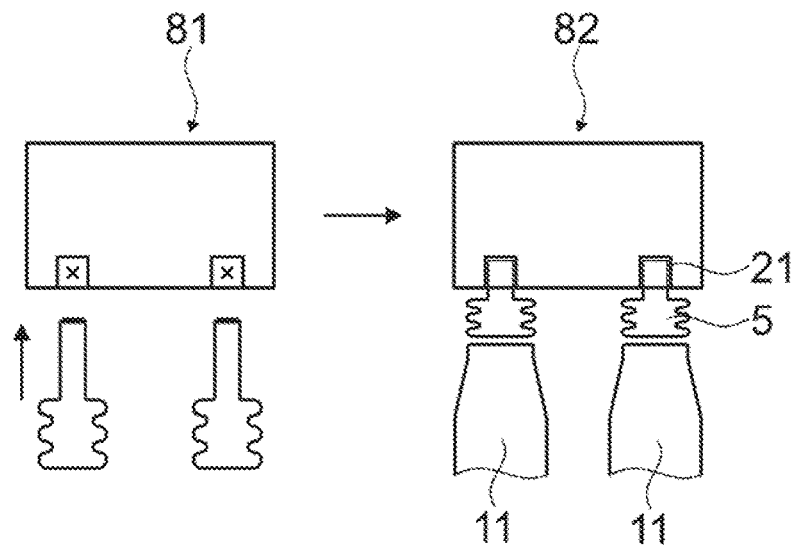
FIG. 13 shows the principle of inserting and subsequently anchoring the first object at subsequent stations.

FIG. 13 illustrates a machine with two stations, namely an insertion station 81 in which first objects (here: fitting elements 5) are inserted into openings 2 of a second object (here: board 1), and an anchoring station 82 in which sonotrodes 11 apply mechanical vibration energy to the fitting elements 5. After insertion of the fitting elements 5 into the board 1 at the insertion station 81, the board 1 is moved to the anchoring station 82 where the anchoring process is carried out. Generally, for embodiments with different stations for insertion and anchoring (not only in the depicted configuration), the following possibilities apply:

In accordance with a first possibility (illustrated in FIG. 13), there is no clamping element at the insertion station 81. The clamping force, applied by means of, e.g., clamping elements 21, is only applied for the anchoring process in the anchoring station 82.

In accordance with a second possibility, a clamping force is applied during the insertion step performed at the insertion station 81, the clamping force is, then released and is again applied for the anchoring step performed at the anchoring station 82.

In accordance with a third possibility there is no clamping element at the anchoring station 82. The clamping force is only applied for the insertion process in the insertion station 81.

In accordance with a fourth possibility, a clamping force is applied at the insertion station 81, and it is upheld during movement and, at least initially, during the anchoring step performed at the anchoring station 82. This may for example be done by a mechanical clamp mounted to the board at the insertion station 81 and then moving along with the board 1, wherein the mechanical clamping is released at the anchoring station 82, after at least a part of the liquefaction of the insert portion 6. Alternatively, a clamping mechanism that moves along with the board 1 may be provided. In this case, the clamping mechanism may optionally at the same time hold the board 1 and carry out, or contribute to, the relative movement from the insertion station 81 to the anchoring station 82.

Figure 14:
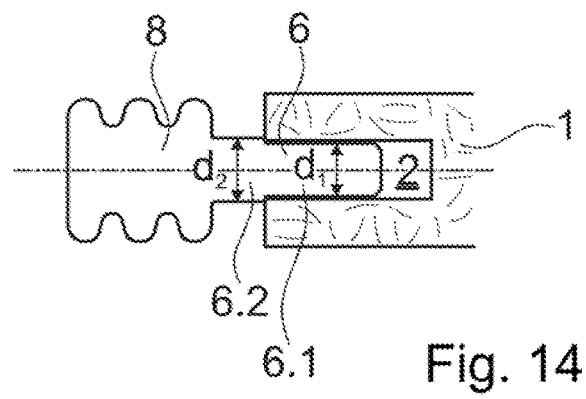
FIG. 14 illustrates a second object with a stepped cross section.

FIG. 14 illustrates a second object with a stepped cross section of the insertion portion 6 of the fitting element 5. The first cross section (diameter $d_1$) approximately corresponds to the cross section of the opening 2 in the board 1 or is slightly smaller than it so that the according first insertion portion section 6.1 may be introduced into the opening 2 without substantial interference force being exerted on the board 1. The second cross section (diameter $d_2$) is oversized, meaning that the second cross section, being the cross section of the second insertion portion section 6.2, is larger than the cross section of the opening 2 in the board 1 so that inserting this second insertion portion section 6.2 provides for an interference fit. In a machine according to the above-mentioned first possibility, the insertion station may introduce the insert portion only to the extent illustrated in FIG. 14, i.e. so that there is no substantial interference force. This makes the stepped cross section (or other cross sections that at least locally are larger at more proximal positions than at more distal positions) attractive in combination with methods/machines in which there is no clamping at an insertion station, as there will be a need for clamping first at the subsequent anchoring station when the second insertion portion section 6.2 is forced into the opening 2 by means of the sonotrode.

What is claimed is:

1. A machine for anchoring a first object comprising a first material being a thermoplastic material in a solid state in a second object of a second material that has pores and is thereby penetrable by the first material when in a liquefied state, the second object having two opposed sides and an end face extending between the opposed sides, the second object having a blind hole with a mouth only in the end face, the blind hole and the mouth being arranged directly between the opposed sides; the machine comprising:

an insertion mechanism configured to move an insert portion of the first object in a first direction through the mouth and at least partially into the blind hole, an anchoring tool configured to anchor the first object in the blind hole by transferring energy to the first object, in an amount and for a time sufficient for liquefaction of the first material and interpenetration of the first and second materials by the first material filling at least some of the pores of the second material in a vicinity of the blind hole; and a clamping mechanism including two clamping elements that engage the two opposed sides to exert a clamping force to the two opposed sides and thus clamp the second object between the two clamping elements, the clamping force being applied along an axis that is perpendicular to the first direction, the clamping force being applied to the second object during the inserting or during the anchoring or both, wherein the machine is configured such that the blind hole is directly between the clamping elements and the axis intersects with the blind hole when the clamping force is applied, and while the insertion mechanism inserts the insert portion or while the anchoring tool transfers the energy or both.

2. The machine according to claim 1, comprising an insertion station and an anchoring station separate therefrom, wherein the insertion station comprises the insertion mechanism and the anchoring station comprises the anchoring tool, wherein the machine is equipped to move the second object from the insertion station to the anchoring station after the inserting, and wherein the anchoring station further comprises the clamping mechanism, whereby the clamping mechanism is capable of applying the clamping force while the blind hole is between the clamping elements and while the anchoring tool transfers the energy.

3. The machine according to claim 1, comprising a plurality of clamping elements including the two clamping elements, the plurality of clamping elements defining a corresponding number of clamping sites on the second object, wherein a distance between the clamping sites is adjustable.

4. The machine according to claim 1, wherein at least one of the clamping elements is provided with a non-sticking arrangement adapted for facilitating release of said at least one of the clamping elements from the second object after release of the clamping force.

5. The machine according to claim 4, wherein said non-sticking arrangement comprises a non-sticking pad from low friction material.

6. The machine according to claim 4, wherein the non-sticking arrangement comprises a gas supply for supplying release gas to a position between said at least one of the clamping elements and the second object.

7. The machine according to claim 1, further comprising a pressurized fluid cylinder, for attenuating the clamping elements.

8. The machine according to claim 7, wherein the pressurized fluid cylinder is a pressurized gas cylinder or a hydraulic cylinder.

9. The machine according to claim 1, further comprising a distance adjustment mechanism for adjusting a distance between the clamping elements.

10. The machine according to claim 1, wherein the energy is mechanical vibration energy, and wherein the anchoring tool comprises a sonotrode for coupling the mechanical vibration energy into the first object.

\* \* \* \* \*